Nov. 28, 1967
J. R. SADIER
3,354,749
MULTIRATIO DRIVE
Filed March 15, 1965
2 Sheets-Sheet 1
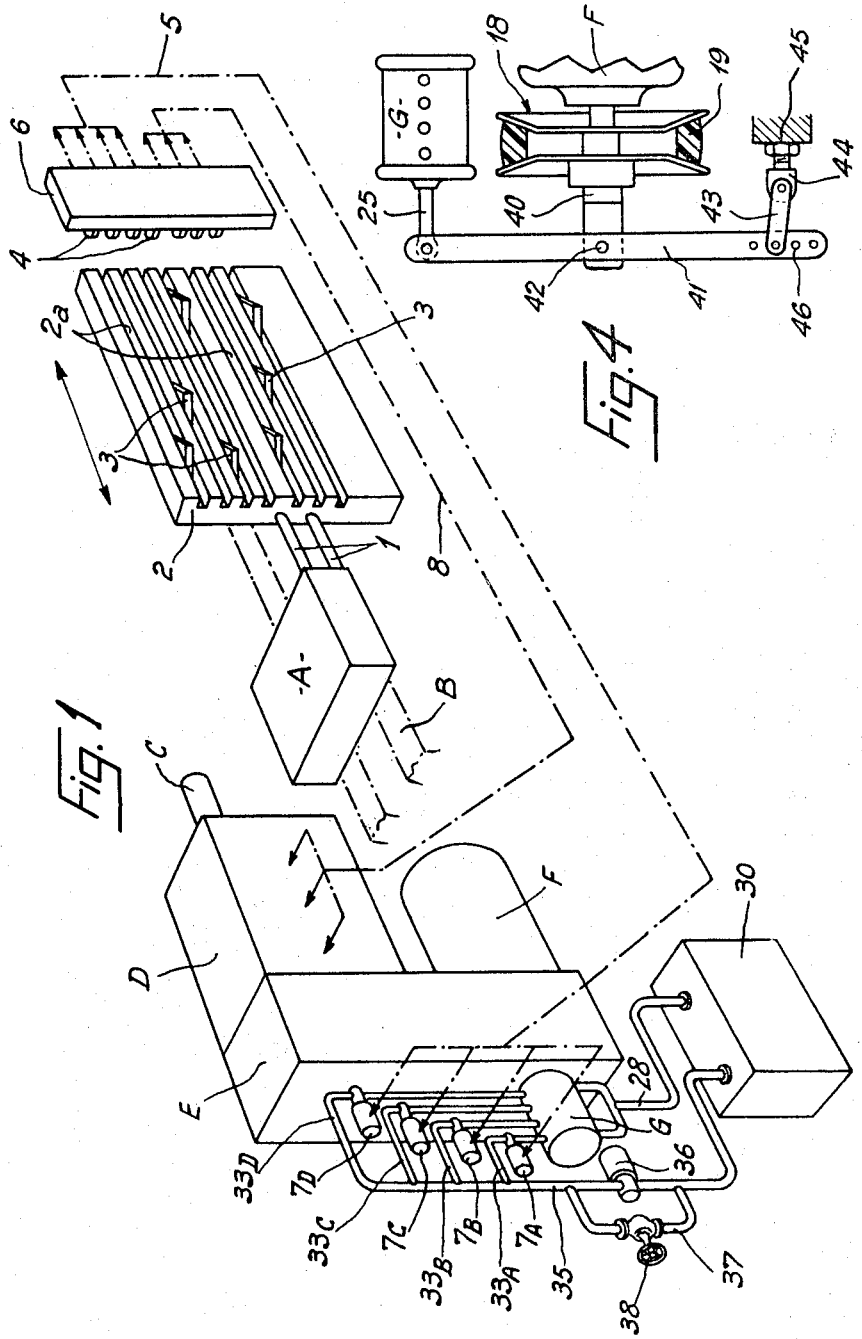
Inventor
Jacques R. Sadier
By Stevens, Davis, Miller & Mosher
Attorneys

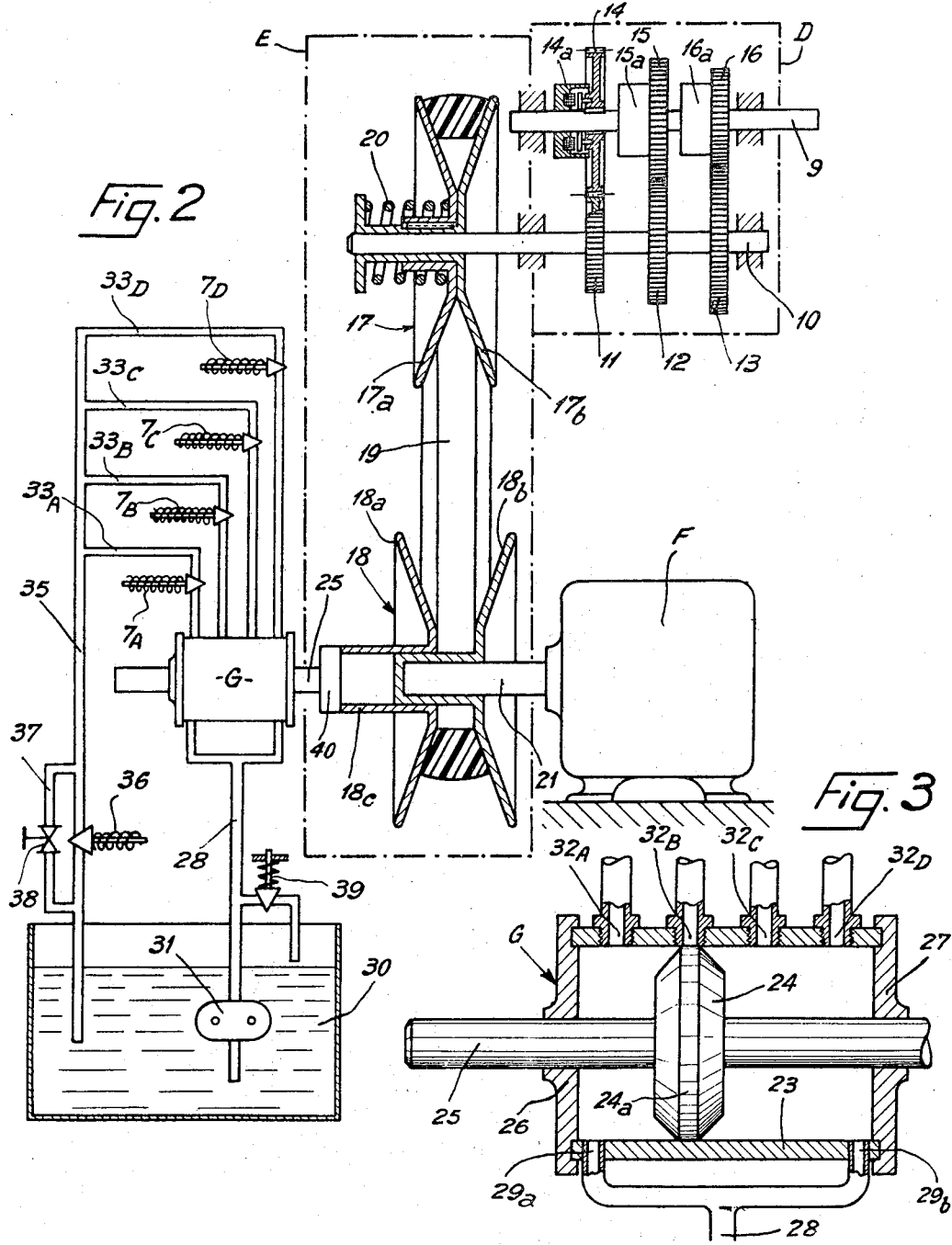

United States Patent Office 3,354,749
Patented Nov. 28, 1967

3,354,749
MULTIRATIO DRIVE
Jacques R. Sadier, 23 Rue Achille Millien,
Nevers, Nievre, France
Filed Mar. 15, 1965, Ser. No. 439,870
Claims priority, application France, Mar. 16, 1964,
967,581
6 Claims. (Cl. 74—745)

ABSTRACT OF THE DISCLOSURE

A machine tool drive having a speed variator unit and a gearbox unit operatively connected. The gearbox unit has a limited number of speed ratios, and the variator is operated by a fluid-jack having a plurality of spaced apart exhaust ports providing a limited number of predetermined positions or speed ratios for the variator. Preferably, the fluid-jack also has an adjsutable flow regulating orifice for controlling the displacement speed of the jack piston, and the force of the jack is transmitted to the speed variator by a linkage, the leverage of which is slightly adjustable. The drive is operated by electrical switch means operated by cams arranged on a displaceable carriage supporting either the tool or the workpiece.

---

This invention relates to transmission systems for driving an output shaft from a prime mover at a selectable one of a plurality of drive ratios. It relates more specifically though not exclusively to such multiratio drive systems as used in the control of a spindle or other rotatable shaft in machine-tools.

It is often desired to drive a machine-tool spindle, or other rotatable mechanical shaft, at a wide range of different angular speeds. In the case of a lathe spindle for example, when turning a workpiece including sections of widely differing diameters, it is desired to rotate the work at a considerably higher angular velocity when cutting a small-diameter section of the work than when cutting a large-diameter section in order to retain a substantially uniform linear cutting velocity for the tool throughout the turning operations. For such purposes and related applications, various multi-ratio drive systems have been devised including gearboxes of the change-speed gear type and continuous speed variators, as well as combinations of both types of unit.

A gearbox is capable of providing only a limited number of drive ratios, but these may cover a very broad total range. A speed variator is usualy able to cater for a much narrower range of drive ratios, but can provide an infinite number of intermediate ratios within this range.

In many important engineering applications including the field of machine-tool control, it is desired to provide for a relatively broad over-all range of output speeds and a relatively great, though finite, number of intermediate speeds within the range. It is also desirable, especially in connection with automatic machine-tool control, to provide for ready selection of a desired ratio in operation. While gearboxes embodying a large number of gear combinations therein, shiftable during rotation, have been constructed, they are complicated and expensive and are not usually satisfactory for the transfer of heavy loads over long periods of time because of the relatively long shafts that have to be incorporated therein. Simpler and sturdier gearboxes in which the number of available gear ratios can be increased by replacement of the gears therein, are of course unsuitable since gear replacement requires disabling the drive.

Furthermore, it would often be desirable, especially in machine-tool applications, while providing a finite number of discrete drive ratios under steady-state conditions of operation, yet to make it possible to shift gradually from one to another selected ratio at a controlled, uniform, rate. One instance of the desirability of this feature is when machining, on a lathe, a workpiece having two cylindrical sections of different radius interconnected by a transverse face. It would then be desirable to set a large drive ratio for the spindle while turning the small-radius section and a low drive ratio while turning the large-radius section, and to shift gradually and uniformly from one ratio to the other, so as to retain a constant cutting velocity for the tool both while turning the two cylindrical sections and while surfacing the radial face interconnecting said sections. Such a controlled rate of shift between discrete drive ratios cannot generally be achieved by means of gearboxes or change speed gears in a simple and effective way.

As indicated above, it has already been proposed operatively to associate a gearbox providing a small number of discrete drive ratios spread over a broad range, with a narrower-range speed variator for providing all intermediate speed ratios. Varying the drive ratio through a speed variator involves exertion of appreciable force. It is consequently found necessary, in combination drive systems of the type just referred to, to provide power means in the form of a servo-motor for controlling the setting of the variator unit. Since this setting is infinitely variable, it has heretofore been found necessary to provide relatively complex feedback devices for controlling and stabilizing the setting of the servo-motor and variator controlled thereby, the resulting system being in the nature of a tracking follow-up system. Such apparatus is complex in itself. Moreover, when it is desired to control such a system automatically as in an automatic machining process, it becomes necessary to introduce a controlling device of a continuously varying character, such as a pattern contour or model and associated feeler unit, connected in the servo loop for exerting continuous control over the variator motor. It is, however, generally recognized that in many contexts it would be extremely desirable to substitute, for a continuous control system of this character, a program control system of discrete (or digital) type, since this technique is found to be more economical as well as being more reliable and more accurate for machine-tool and other automatic control processes.

Objects of this invention include the provision of a multi-ratio transmission or drive system possessing part or all of the following advantageous features:

A broad over-all range of drive ratios encompassing a relatively large number of discrete ratio values, while using a gearbox unit of simple, sturdy construction, and ready selection of any one of said drive ratio values in operation.

Provision for selecting a desired drive ratio out of a discrete series of ratios for steady-state operation of the system, coupled with the possibility of shifting from one ratio to another selected ratio of the series at a controlled uniform rate.

A high speed of response of the system to drive ratio-selecting or shifting actions when this is desired.

Ready amenability to automatic control by means of digital techniques, such as those using presettable program (or digital storage) controller units of mechanical, or other, type.

The system utilizes as its basic components, a gearbox and a variator unit each of which may be of standard, readily available type, simple, sturdy, reliable and inexpensive.

Other objects of the invention will appear.

The invention, in an important aspect, provides a multiratio transmission system comprising a gearbox unit and a speed variator unit interconnected in serial driving relationship with each other between an input shaft and an output shaft, force-developing means connected to a control element of the variator unit for varying the speed ratio therethrough over a range of values, and selective control means for constraining the force-developing unit to assume and maintain a selected one of a series of discrete positions.

An exemplary embodiment of the invention will now be described for purposes of illustration but not limitation with reference to the accompanying drawings, wherein:

FIG. 1 is a partly schematic perspective view of a multi-ratio drive system according to the invention also showing part of a machine-tool in conjunction with which the system is used, and automatic control means associated therewith.

FIG. 2 shows the multi-ratio drive system partly in simplified axial sectional view and partly in schematic form.

FIG. 3 is a view of a multi-positional fluid motor used in the system, in simplified axial cross section; and FIG. 4 is a view corresponding to part of FIG. 2 in a modified form of the invention.

In the illustrative example, the invention is shown applied to the drive of a lathe spindle, but it is to be understood that various other components of machine-tools, not necessarily lathes, and other machine parts, can be driven through the system of the invention.

Referring to FIG. 1, A designates a slide of the lathe, adapted to carry a cutting tool (not shown), and displaceable on ways B over the bench of the lathe. Letter C designates the lathe spindle. This spindle, in accordance with the invention, is driven from the output of a gearbox D which in turn is driven from the output of a speed variator E, the input shaft to which is rotated by an electric motor F.

Gearbox D in this example is settable to three different gear ratios, as schematically indicated by the three arrowheads shown applied to one side thereof from the dot-dash connecting line 8. Variator E is herein settable to four different speed settings as schematically indicated by the four arrowheads applied to the four valves 7A, 7B, 7C, 7D, from the dot-dash connection 5. As will be presently made clear, the schematical links 5 and 8 may each represent an electric circuit link.

It is here assumed that the angular velocity of spindle C is to be automatically controlled in accordance with a preset programme sequence which is a function of the longitudinal position of slide A along its ways B. For this purpose the slide A is shown rigidly connected by way of the two bars 1, to a programme unit 2 which is in the form of a vertical plate having a number of, herein seven, horizontal grooves therein in each of which a cam finger 3 is longitudinally settable. Cooperating with the program assembly 2 is a stationary contact switch assembly 6 which includes a number, herein seven, switch actuators 4 positioned to be displaced between their contact making and breaking positions on engagement by the cam fingers 3 positioned in respective ones of the grooves in plate 2. The actual switch members, not shown, controlled by the displacement of actuators 4 may be of any suitable type used in automatic control, and may be actuated by the fingers 3 so as to move momentarily or durably to prescribed positions.

As schematically indicated by four arrowheads, the upper four switch members of the switch assembly 6 are connected to the circuitry 5 so as to actuate the speed-variator control valves 7A, 7B, 7C, 7D respectively; and the lower three switch members are connected to circuitry 8 so as to move the gearbox D to each of its respective three speed settings.

Referring to FIG. 2, gearbox D in this example comprises the parallel input and output shafts 10 and 9, it being understood that output shaft 9 may be drivingly connected with spindle C or itself may constitute that spindle. Input shaft 10 carries the spaced input gears 11, 12, 13 secured to it, and output shaft 9 carries the corresponding gears 14, 15, 16, in permanent engagement with the respective input gears. The output gears 14, 15, 16 are normally freely rotatable on output shaft 9, but may be selectively secured to it by way of respective clutch means 14a, 15a, 16a. These clutch means may be of any suitable type capable of being readily operated between their engaged and disengaged conditions during rotation of shaft 9. In this example, as illustrated by the cross sectional view for clutch 14a, the three clutches are of the electrically actuated magnetic type, which are engageable by energizing an electromagnetic coil in the clutch.

As shown, the gear ratios of the three pairs of gears in gearbox D are different, and it will be apparent from the drawing that energization of the solenoid in magnetic clutch 14a, to engage that clutch, will provide a lowermost drive ratio from input shaft 10 to output shaft 9; energization of a solenoid in clutch 15a will provide an intermediate drive ratio; and energization of a solenoid in clutch 16a will provide a highermost drive ratio.

As will be understood from earlier explanations, the energization of the electromagnets providing for the selective engagement and disengagement of each of the clutches 14a, 15a, 16a, is controlled through the electrical circuit schematically indicated as the dot-dash link 8, from the switch assembly 6.

The speed variator unit E, in this example, is of the type including a V-belt drive with axially expansible pulleys. Specifically, variator E includes an input or drive pulley 18 rotatable bodily with the shaft 21 of electric motor F, and an output or driven pulley 17 rotatable with the gearbox input shaft 10. Each of the pulleys 17 and 18 comprises a pair of flanges, 17a–17b, and 18a–18b respectively, flanges 17b and 18b being fixed both axially and angularly with the respective shaft 10 or 21, while flanges 17a and 18a are mounted for rotation with said respective shafts, but are axially slidable therealong towards and away from the companion flanges 17b, 18b. The pair of flanges in each pulley defines a V-groove of variable width in which a drive belt 19 of corresponding V section is received. In pulley 17, movable flange 17a is constantly urged towards flange 17b by a spring 20. In pulley 18, the movable flange 18a is variably positionable with respect to flange 18b by the action of a fluid servo-motor G. It will be apparent that with the arrangement so far described, when flange 18b is positioned a maximum axial distance from flange 18b the drive ratio through the variator E is minimum, when flange 18b is positioned in close engagement with flange 18b said drive ratio is a maximum, while for intermediate axial positions of flange 18a all intermediate drive ratios can be obtained through the speed variator.

FIG. 3 illustrates the servo-motor G as including a cylinder 23 and a piston 24 slidable therein and attached to a piston rod 25 which extends through the orificed end plates 26, 27 of cylinder 23 by way of sealing means not shown. One end of rod 25 is connected for axial displacement (but not for rotation) with the movable pulley flange 18a by way of a suitable connector 40, such as a two-way axial ball thrust bearing of conventional type, having one ballrace secured to piston rod 25 and its other ballrace secured to the outer end of a sleeve 18c forming an axial hub extension of pulley flange 18a, the sleeve 18c being mounted for rotation with, and axial movement with respect to, a cylindrical hub part of the fixed pulley flange 18b, e.g. by means of a keyway not shown.

With the extremities of the cylinder 23 communicate the two fluid ports 29a and 29b, which both connect with a common line 28 which constitutes the output line of a suitable pump such as a gear pump 31, arranged to draw liquid, e.g. oil, from a reservoir sump 30. Branching off from oil delivery line 28 is a by-pass line including a relief valve 39 which is spring-biased to open when the pressure in line 28 exceeds a preset safe value, to allow excess pressure liquid to return to the sump. It will thus be understood that pump 31 may be driven from a permanently running motor, not shown.

In addition to the inlet ports 29a and 29b, the cylinder 23 has a set of four further ports having liquid connectors or nipples 32A, 32B, 32C, 32D therein. These four ports are axially spaced along the length of the cylinder and, while shown for simplicity aligned on a common generatrix of the cylinder, they may, if desired, be formed at circumferentially spaced positions in order to avert structural weakening of the cylinder wall. All four ports 32A–32D are connected by way of individual exhaust lines 33A–33D respectively, with a common exhaust manifold line 35 which returns to the sump 30. Interposed in each of the exhaust connections 33A–33D is a related one of the control valves 7A–7D earlier referred to. As shown in FIG. 2, each of these control valves has an electromagnet winding associated with it, energizable e.g. for opening the valve. It will be understood from earlier explanations that the energization of the electromagnets controlling the positions of the servo-control valves 7A–7D is controlled through the electrical connections schematically indicated at 5, from the switch assembly 6.

The piston 24 (see FIG. 3) has a flat cylindrical peripheral land 24a which corresponds in axial length to the axial length of each of the four ports 32A–32D, so that the land 24a exactly covers each of the four ports in a corresponding one of four axial positions of the piston within the cylinder.

The exhaust manifold or return line 35 (FIG. 2) is provided with a bypass 37 in which an adjustable flow-regulating valve 38 is interposed. The line 35 has interposed in it, between the end connections of the bypass line 37, an electrically operated cutoff valve 36, so that energization of the actuating solenoid of valve 36 constrains the liquid to flow through the regulator valve 38 on its return to the sump, thereby limiting the rate of flow through the circuit to a value determinable by the setting of the regulator valve.

In the operation of the servo-motor shown in FIG. 3, it will be understood that only one of the four valves 7A through 7D is open at any time due to energization of its actuator winding. Assume that valve 7B is open. Then with piston 24 positioned in cylinder 23 anywhere but at the precise position at which land 24a is covering exhaust port 32B, liquid pumped by pump 31 enters both ends of the cylinder through inlet ports 29a and 29b but can leave the cylinder only through port 32B, and the piston is exposed on its opposite sides to a pressure differential which urges it in the axial direction towards the port 32B. As the piston land 24a registers with port 32B, the pressure differential vanishes and the piston 24 is locked in this position by the pressure of the liquid trapped on its opposite sides. If it is now desired to shift the piston 24 to another of its stable positions, say position 32C, electrovalve 7B is closed and electrovalve 7C is opened. Liquid is thus allowed to flow from the cylinder chamber to the right of piston 24 through port 32C, and the resulting pressure differential urges the piston rightward until land 24a covers port 32C, at which time the piston becomes locked at this fresh position by the pressure of the bodies of liquid trapped in the two cylinder chambers on its opposite sides.

It will be understood that in each of the stable positions of piston 24 in the servo-motor cylinder, there is established a corresponding axial spacing between the flanges 18a, 18b of variator control pulley 18 and hence a corresponding drive ratio through the variator E. The variator therefore is seen to possess a limited number, herein four of discrete stable drive ratio settings, obtainable through action on the servo control electrovalves 7A–7D in the manner above described.

With the return cutoff valve 36 in open condition, the shifting of piston 24 from one to another selected one of its stable positions by the above described procedure can be effected in an extremely short time, so that the rate of response of the speed variator E can be made virtually as high as desired, being at least as rapid as the response rate of a purely mechanical gearbox e.g. of the type shown for gearbox D. However, the invention also preferably provides for the possibility of effecting the change in drive ratio through the speed variator E in a slow and uniform manner when this is desired. For this purpose it is simply necessary to close the electrovalve 36 and thus force the liquid on its return path to sump 30 to flow through the flow regulator valve or orifice 38 provided in bypass 37. In these conditions the linear velocity of displacement of piston 24 from one to another of its positions as selected by action on the electrovalves 7A–7D, is limited to a value established by the setting of regulator valve 38, and can be made as slow as may be desired.

It will be evident that the over-all drive system of the invention as described herein can be set to a total of twelve drive ratios, twelve being the product of the number, four, of settings available for variator E times the number, three, of gear ratios in gearbox D. Each of these twelve drive ratios or combinations is established by the concurrent actuation of an appropriate one of the four switch members 4 of the upper group, and of an appropriate one of the three switch members 4 of the lower group. In the exemplary embodiment described, the sequence in which these drive ratios or combinations are established during an operating cycle of the machine-tool is controlled by the presetting of the cam fingers 3 in their slots in programming plate 2. It will be understood that said cam fingers 3, in addition to controlling the speed of rotation of spindle C (which in this instance represents the speed of rotation of the workpiece since the machine tool is assumed to be a lathe), may likewise control further operating factors including the rate of feed of the slide A, as well as the traversing (and/or substitution) of cutting tools in different phases of the work cycle, the depth of the cutting pass in different cycles, the removal and insertion of workpieces at the end of a cycle, the stopping and starting of cutting operations, and the operation of auxiliaries, including electrovalve 36, and possibly regulator valve 38.

To take a somewhat more specific example, it may be assumed that the work cycle of the lathe involves the turning of two different-diameter cylindrical sections of a workpiece, and the machining of a radial transverse surface interconnecting both sections. It is generally desired that the linear cutting velocity of the tool should be substantially equal in all three machining steps thus involved. The cam fingers 3 may then be preset so as to establish one gear ratio through gearbox D together with a first drive ratio through variator E throughout the length of the tool feed displacement corresponding to a first one of the two sections of the workpiece, say the smaller-diameter section; and to establish the same gear ratio through gearbox D together with a second drive ratio through variator E over the length of tool feed displacements corresponding to the second, larger-diameter section of the workpiece, said second variator drive ratio being lower than the first drive ratio in inverse proportion to the diameters of the two sections involved. This of course will ensure that the linear cutting velocity is the same in turning both cylindrical sections of the workpiece.

The programmer unit 2 would of course also be preset so that on completion of the longitudinal feed displacement corresponding to the first, smaller-diameter section of the work, the tool carrier (not shown) will be traversed radially away from the axis of spindle C in order to machine the transverse face of the work connecting both cylindrical sections and assume the position required to turn the second, large-diameter cylindrical section of the workpiece. This radial traverse would be effected, through conventional means not shown, at a uniform velocity. Then, in accordance with the invention, one of the cam fingers on programmer unit 2 would also be preset so as to actuate a switch member 4 to close the normally-open return cutoff valve 36 at the instant the tool has completed its first longitudinal feed travel corresponding to the smaller-diameter work section and commences its radial outward traversing movement. Consequently, throughout this traverse, the servo-motor piston 24 will be displaced from its initial axial position, corresponding to the higher variator ratio, to its final axial position corresponding to the lower variator ratio, at a slow uniform speed as determined by the setting of flow regulator valve 38. It is clear that under these conditions the linear cutting velocity of the tool will remain constant throughout the traversing movement, and hence also throughout the entire cutting cycle here contemplated.

Conventional speed variators, for instance of the variable-ratio V-belt drive type illustrated in FIG. 2, are usually constructed to provide only a limited range of drive ratios, a total range of about from 1:1 to 4:1 being commonly used. Desirably, the gearbox D associated according to the invention with the speed variator E is arranged to provide between each pair of adjacent speed settings therein a ratio equal to the total range available in the variator. Thus, in the case of a three-speed gearbox D and a speed variator E with a total range of 4/1 as just mentioned above, the three speed ratios through the gearbox D may for example be 1:1, 4:1 and 16:1. The complete drive system will then permit of varying the output speed of spindle C in a total range of from 1 to 64, say from 40 r.p.m. to 2560 r.p.m. While the variator E in the exemplary embodiment illustrated has been shown for simplicity as having four stable drive ratios as determined by four axial positions of the servo-piston 24 in register with the four exhaust ports shown, any other suitable number of variator settings may be used according to the invention. Thus in one practical embodiment, wherein a three-speed gearbox D was used as described above, the variator E was provided with six ratio settings wherein the ratio between any two adjacent ratios of the series was 1.26 (that is, such that $1.26^6 = 4$), to provide the 4:1 over-all range through the variator as mentioned above.

It will of course be understood that the specific numeric data given above is illustrative only and considerable departures may be made therefrom within the scope of the invention.

In accordance with a desirable feature of the invention, means are provided for accurately adjusting the values of each of the drive ratios provided by the speed variator. Such a feature is especially desirable in the case of a variator of the general type shown in FIG. 1, because of the unavoidable manufacturing tolerances in the length of the V-belt and subsequent elongations in the belt length with time in service. As shown therefore in the modification of FIG. 4, the piston rod 25 of servomotor G, instead of being directly connected to the ball thrust bearing 40 for axial displacement of variator control pulley flange 18a, is pivoted to one end of a lever 41, having an intermediate point 42 thereof pivoted to a clevis member connected to bearing 40. The free end part of lever 41 has a linear series of holes 46 formed in it, and a link 43 has one end pivoted by means of a pin selectively insertable into any one of the holes 46, while the other end of link 43 is pivoted to a clevis 44 provided with a screw rod 44a engageable an adjustable depth in a threaded hole formed in fixed supporting structure 45, and blockable by means of a nut in its adjusted position.

To perform an accurate adjustment of the speed variator E by means of the device just described, the link 43 may first be engaged with an intermediate one of the row of holes 46 in lever 41, the speed variator E is set to one, preferably an intermediate one, of its ratio settings through suitable action on the servo-control valves 7A–7D, and the resulting angular velocity of output shaft 9 or C is observed with an accurate speed indicator device such as calibrated rev-counter or stroboscipally. The screw rod 44A of clevis 44 is then threadedly adjusted as to its depth of threaded engagement in the support 45, until the velocity of the output shaft is seen to be exactly equal to a desired value. The variator is then readjusted to another of its speed settings by acting on values 7A–7D, and the output shaft speed is again observed by comparison with a suitable reference value. If a discrepancy is noted, the pivotal connection of link 43 with lever 41 is readjusted by selecting a different one of the holes 46 in which to insert the link pivot pin. This alters the difference between adjacent ratio settings of the variator E. By this dual adjusting means the entire scale of drive ratios through the variator can be pre-adjusted, and readjusted from time to time, with considerable precision.

The linkage illustrated in FIG. 4, in addition to its use in adjusting the scale of variator drive ratios, has a further advantage in that it amplifies the amount of servo-motor piston displacement for a given axial displacement of the variator control pulley flange, in the ratio corresponding to the mechanical advantage of the lever 41. This is desirable in that it increases the axial dimension of the servo-motor cylinder 23 and facilitates accurate locating of the exhaust ports 32A–32D, while making it possible to reduce the diameter of the servo-motor cylinder.

It will be apparent that various modifications, other than those specifically referred to, may be introduced into the single embodiment illustrated and described without departing from the invention. Thus, the variator E may assume any suitable form adapted for operation by a servo-motor, in order to set the drive ratio therethrough, and stably maintain said drive ratio at a prescribed value. Friction cone and metal band type variators may be used. Although the fluid cylinder-and-piston type of positional servo-motor herein disclosed has been found extremely advantageous and constitutes a preferred aspect of this invention, other types of force-developing devices, operable to displace a movable control element of the variator to any one of a limited number of positions, and maintaining it in the selected position in a stable, yet preferably resilient, manner, may serve as the servo-motor in the system of the invention. Moreover, regardless of the type of servo-motor used, the control means therefor herein shown as comprising electrically operated valves, may clearly assume any of various well-known forms.

The use of a programming unit, herein shown in the form of the presettable cam-bearing plate 2 and associated switch assembly 6, is not essential to the basic aspect of the invention, since the servo-motor control means, provided by the electrovalves in the described example, may conceivably be operated manually or by other methods. However, a programming or digital memory device of some sutiable type is advantageously used in the application of the invention to machine-tool control. Such programming device where used may naturally depart considerably from the form illustrated. Thus, the cams or other presettable members corresponding the fingers 3 may be provided on a revolving drum provided with axially spaced circumferential grooves, a device of this form being especially appropriate in the case of cyclically controlled mechanisms, e.g. machine-tools. The programming unit, rather than acting on the valves or equivalent servo-motor control means by way of electric switches as here disclosed, may act through other agencies, as by way of mechanical linkages or by way of fluid pressure.

Multi-positional fluid actuators or servo-motors of the type disclosed at G in FIGS. 2 and 3, may be regarded as incorporating internal positional feedback or follow-up means therein, and may find considerable utility in various fields of engineering apart from the variator and gearbox combination drive herein disclosed.

What I claim is:

1. A multiratio transmission system from a drive to a driven shaft comprising:
   a gearbox unit having means for setting the speed ratio therethrough to a selected one of a number of values;
   a speed variator unit having a control element displaceable over a range of positions for varying the speed ratio therethrough over a range of values;
   means operatively connecting both units in serial driving relation with each other between said drive and driven shafts;
   a positional servo-motor including a cylinder member and a piston member slidable with respect to each other;
   means connecting one of said members to said variator control element;
   a power fluid circuit having a source of pressure fluid and an exhaust;
   a pair of inlet ports opening into respective ends of said cylinder member and connected to said pressure source;
   a series of exhaust ports opening into said cylinder at points spaced along the axial length thereof and individually sealable by said piston member;
   exhaust passages connecting said exhaust ports individually with said exhaust;
   valves selectively controlling said exhaust passages to select the equilibrium position assumed by said piston member relative to said cylinder member from a series of positions as determined by the positions of said exhaust ports and thereby select the variator speed ratio from a corresponding number of discrete values within its said range;
   a common exhaust manifold having one end connected with all said exhaust passages and another end connected with said exhaust of the fluid circuit;
   a cut-off valve positioned in said manifold;
   a bypass line shunting said cut-off valve; and
   an adjustable flow regulated orifice in said bypass line for controlling the velocity of relative displacement of said piston and cylinder members.

2. A multiratio transmission system from a drive to a driven shaft comprising:
   a gearbox unit having means for setting the speed ratio therethrough to a selected one of a number of values;
   a speed variator unit having a control element displaceable over a range of positions for varying the speed ratio therethrough over a range of values;
   means operatively connecting said units in serial driving relationship with each other between said drive and driven shafts;
   a positional servo-motor including a motor member displaceable over a range of positions, and means for applying power to said member to displace it;
   means connecting the motor member to said variator control element, and comprising a lever, means pivotally connecting spaced points of the lever to said member and element respectively, means pivotally connecting a third point of the lever to stationary supporting means, and adjusting means for adjusting the position of said third point of pivotal connection with respect to said first two points, said adjusting means including means for adjusting the position of said third point in a direction generally lengthwise of said lever and means for adjusting the position of said third point in a direction generally transverse of said lever; and
   selective control means for shifting the motor member to and arresting it in a selected one of a series of predetermined discrete positions so as to set the variator speed ratio to a corresponding one of a series of discrete values within its said range.

3. A multipositional drive system comprising:
   a servo-motor including a cylinder member and a piston member slidable with respect to each other;
   a power fluid circuit having a source of pressure fluid and an exhaust;
   a pair of inlet ports opening into respective ends of said cylinder member and connected to said pressure source;
   a series of exhaust ports opening into said cylinder at points spaced along the axial length thereof and individually sealable by the piston member;
   exhaust passages connecting said exhaust ports individually with said exhaust;
   valves selectively controlling said exhaust passages to select the equilibrium position assumed by said piston member relative to said cylinder member from a series of discrete positions as determined by the positions of said exhaust ports;
   a common exhaust manifold having one end connected with all said exhaust of the fluid circuit; and
   an adjustable orifice in said manifold for controlling the flow velocity through said circuit and thereby controlling the velocity of relative displacement of said piston and cylinder members.

4. A multiratio transmission system from a drive to a driven shaft comprising:
   a speed variator unit having a control element displaceable over a range of positions for varying the speed ratio therethrough over a range of values;
   a gearbox unit comprising a plurality of permanently meshing gears, clutches associated with said gears and operable during rotation of said gears to set the speed ratio through the gearbox to each of said number of values, and wherein any two consecutive ones of said gearbox speed ratio values are in a substantially constant ratio approximately equal to the ratio between the maximum values of range of speed ratio values of said variator unit;
   means operatively connecting both units in serial driving relation with each other between said drive and driven shaft;
   a positional servo-motor comprising a cylinder member and a piston member slidable therein, a series of ports opening into the cylinder at axially spaced positions along its length and individually sealable by said piston member, a pressure fluid circuit having said cylinder connected therein, and valves for selectively controlling said ports;
   selective control means for shifting the motor member to and arresting it in a selected one of a series of predetermined discrete position so as to set the variator speed ratio to a corresponding one of a series of discrete values within its said range; and
   means connecting one of said members to said variator control element to set the variator speed ratio to a corresponding one of a series of discrete values within its said range.

5. The system defined in claim 4, including a calibrated orifice in said power fluid circuit for controlling the velocity of relative displacement of said piston and cylinder members.

6. In a mechanical assembly including a rotatable shaft and a displaceable component, a multiratio drive system for said shaft comprising:
   a prime mover;
   a gearbox unit having electrically actuated clutches for setting the speed ratio therethrough to a selected one of a number of discrete values;
   a speed variator unit having a control element displaceable over a range of positions for varying the speed ratio therethrough over a range of values;
   means operatively connecting said units in serial drive relationship with each other between said prime mover and shaft;

force developing means connected to said variator control element and including electrically actuated valves operable to constrain said element to assume and maintain a selected one of a series of predetermined discrete positions within said range;

a presettable programming device connected for displacement by said component, said programming device comprising a support displaceable on displacement of said component, a plurality of cam members individually presettable to selected positions on said support, and generally stationary switch actuator members operable by the respective cam members on displacement of said support, including first switch actuator members electrically connected to said electrically actuated clutches and second switch actuator members electrically connected to said electrically actuated valves; and means connecting said programming device with said first and said second selective control means for selecting combinations of said gearbox speed ratios and variator speed ratios during displacement of said component and in accordance with a programmed sequence.

References Cited

UNITED STATES PATENTS

| | | | |
|---|---|---|---|
| 1,720,056 | 7/1929 | Ratigan | 74—105 |
| 2,398,997 | 4/1946 | Berry et al. | 74—472 |
| 2,427,493 | 9/1947 | Bullard | 192—142 |
| 2,487,735 | 11/1949 | Sherman et al. | 74—745 |
| 2,489,725 | 11/1949 | Rutemiller | 74—745 |
| 2,528,736 | 11/1950 | Bullard | 192—142 |
| 2,621,545 | 12/1952 | Karig | 74—745 |
| 2,924,199 | 2/1960 | Lawson et al. | 91—42 |
| 3,146,633 | 9/1964 | Schmitter et al. | 74—472 |
| 3,156,157 | 11/1964 | Smith et al. | 91—357 |
| 3,246,572 | 4/1966 | Ogilvie | 91—357 |

OTHER REFERENCES

Product Engineering, April 10, 1961, page 52, "Pushbutton Selects Exact Speed Quickly."

DONLEY J. STOCKING, *Primary Examiner.*

THOMAS C. PERRY, *Examiner.*